Figure 1:
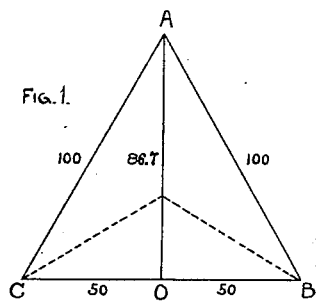

(No Model.) 2 Sheets—Sheet 1.

C. F. SCOTT.
SYSTEM OF ELECTRICAL DISTRIBUTION BY ALTERNATING CURRENTS.

No. 521,051. Patented June 5, 1894.

WITNESSES:
George Brown Jr.
Hubert C. Tener

INVENTOR,
Charles F. Scott
BY Terry and MacKay
ATTORNEYS.

(No Model.)  2 Sheets—Sheet 2.

C. F. SCOTT.
SYSTEM OF ELECTRICAL DISTRIBUTION BY ALTERNATING CURRENTS.

No. 521,051.  Patented June 5, 1894.

WITNESSES:
George Brown Jr.
Hubert C. Tener

INVENTOR,
Charles F. Scott
BY Terry and MacKay
ATTORNEYS.

UNITED STATES PATENT OFFICE.

CHARLES F. SCOTT, OF PITTSBURG, PENNSYLVANIA.

SYSTEM OF ELECTRICAL DISTRIBUTION BY ALTERNATING CURRENTS.

SPECIFICATION forming part of Letters Patent No. 521,051, dated June 5, 1894.

Application filed February 26, 1894. Serial No. 501,565. (No model.)

*To all whom it may concern:*

Be it known that I, CHARLES F. SCOTT, a citizen of the United States, residing at Pittsburg, in the county of Allegheny and State of Pennsylvania, have invented a new and useful Improvement in Systems of Electrical Distribution by Alternating Currents, (Case No. 585,) of which the following is a specification.

My invention relates generally to those systems of electrical distribution which employ multiphase alternating currents.

The invention involves a system of electrical distribution in which multiphase currents of different numbers of phases are employed and a novel method of and apparatus for accomplishing the change from one number of phases to another number of phases. The purpose is the transmission of electric currents by the number of phases best securing the highest economy and convenience and involves the change to this number of phases from the number generated at the source of current, or the change from the number used in transmission to the number desired for translating devices, or both changes. It has been demonstrated that a greater weight of copper conductor is required for transmitting two-phase currents, that is to say, alternating currents the phases of which differ from each other by ninety degrees, than is required for the transmission of the same amount of energy over the same distance with the same loss by three-phase currents, that is to say, alternating currents whose phases differ from each other one hundred and twenty degrees. On the other hand, for certain purposes in alternating current work it is desirable to employ the two-phase system, as it lends itself more readily to certain classes of work. It is also frequently desired to generate two-phase currents instead of three-phase currents, and hence it is desirable to provide a method and means by which two-phase alternating currents may be changed into three-phase currents, either at or near the generating point or at some other locality, and the energy transmitted as three-phase currents. This is of special importance where the distance to be traversed is great. At the receiving end it may be desired to employ the energy in the form of three-phase currents, or to transform it again into two-phase currents utilizing it in that form. It is, however, desirable in some cases to originally generate three-phase currents, and, after transmitting the same over suitable conductors, to transform them into two-phase currents. The potential of the currents may be raised or lowered by the same operation or kept the same, to suit the requirements of different cases. Again, it may be desired to generate two-phase currents and operate translating devices by three-phase currents.

Figure 2:
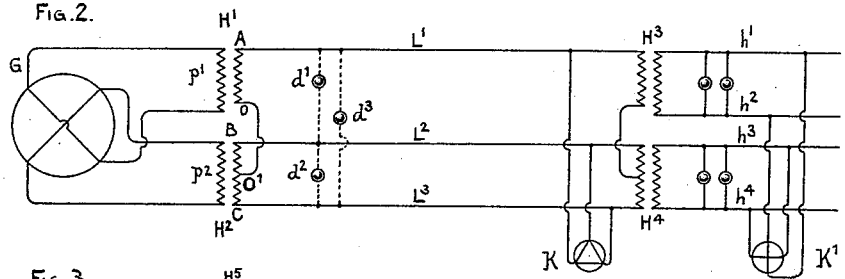
Figure 3:
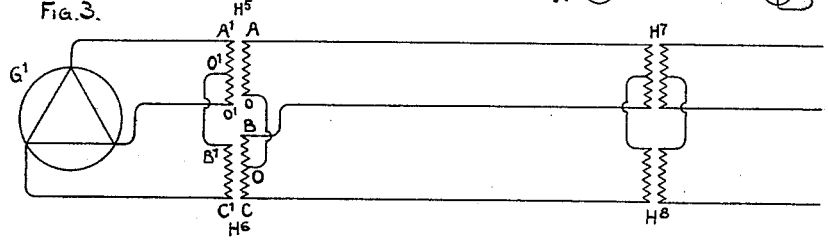
Figure 4:
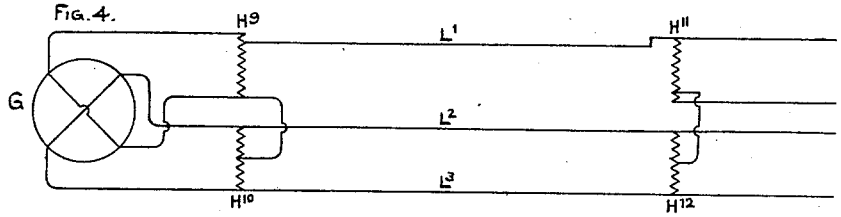
Figure 5:
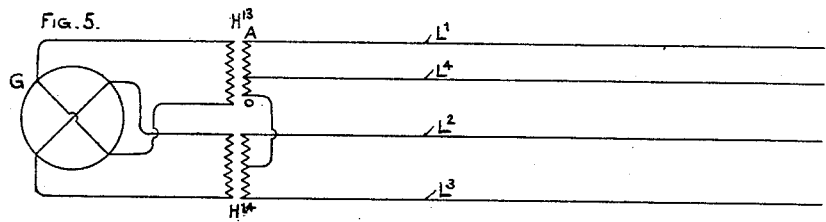
Figure 6:
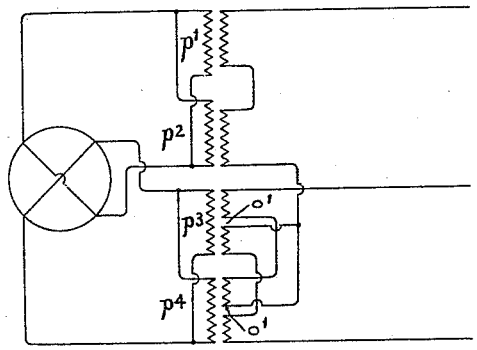

In the accompanying drawings, Figure 1 is a mathematical diagram designed to aid in a clear understanding of the invention. Fig. 2 is a diagram illustrating an organization of apparatus for generating two-phase alternating electric currents, transforming the same into three-phase currents, and transmitting the same to a distance and there utilizing them either as three-phase currents or transforming them into two-phase currents. Fig. 3 illustrates a system of apparatus for transforming three-phase currents into three-phase currents of the same or a different potential. Fig. 4 illustrates the employment of the invention in connection with single coil or auto transformers instead of two coil transformers; and Fig. 5 illustrates an organization for obtaining three-phase currents upon four conductors. Fig. 6 illustrates a modified organization.

It is well known that if two conductors, in which are generated electromotive forces differing by ninety degrees, be connected in series, the electromotive force between the free terminals is equal to the diagonal of a rectangle whose sides are proportional to the two component electromotive forces. Assuming the diagonal to have a value of one hundred, and the base fifty, then the perpendicular will be equal to one half the square root of three, or about 86.7.

Referring to Fig. 1, assume that A O is an electromotive force of say about 86.7 volts, and O B an electromotive force of fifty volts the maximum value of which occurs when O A is zero, and that the coils in which these electromotive forces are produced are joined together, then the electromotive force between the free ends is proportional to the line A B and is therefore one hundred volts. The phase of the resultant, it will be seen, differs from O A by thirty degrees, and from O B by sixty degrees. In a similar manner the electromotive force O A may be combined with an electromotive force O C ninety degrees from the electromotive force O A and one hundred and eighty degrees from the electromotive force O B. The resultant is the electromotive force A C equal to A B if O C is equal to O B in value. Therefore two electromotive forces, as A O and B C, differing in phase ninety degrees, can be suitably related to give two resultants, A B and A C, equal in value but differing in direction. The values selected for illustration give resultants equal to one hundred volts, which is also the value of the line C B. It follows therefore, that from an electromotive force O A and an electromotive force B C composed of two electromotive forces B O and O C, each ninety degrees from O A, three electromotive forces can be produced equal in value the angular relations of which form an equilateral triangle.

The electromotive force O A may be obtained from the secondary of a transformer. The electromotive force O B may be obtained from the secondary of a second transformer, the primary of which is supplied by current differing in phase ninety degrees from the current by which the first transformer is supplied. The secondary of the first transformer may be connected to the middle point of the secondary of the second transformer. This combination is then adapted to give electromotive forces corresponding to the diagram above described, if the number of turns in the secondary of the first transformer be equal to the number of turns in the second transformer multiplied by one-half the square root of three, and it will be found that the electromotive force between any pair of free ends is equal to that between any other pair. This condition proves the existence of the so-called three-phase relation. If, for instance, three lamps be connected between the various pairs of terminals, it will be found that the current in any lamp is one hundred and twenty degrees ahead of the current in one of the other lamps and one hundred and twenty degrees behind that in the remaining lamp.

Referring now to Fig. 2, G represents any suitable source of two-phase currents, that is to say, currents differing from each other ninety degrees in phase. Two transformers are indicated at H' and H², the primary coils P' and P² thereof being respectively connected with the source to receive currents differing ninety degrees in phase. The secondary coil A o of one of these transformers has a length, the ratio of which to the length of the secondary coil B C of the other transformer is as one-half the square root of three is to one. One terminal of the coil A o is connected with approximately the central point O of the coil B C. The remaining terminals of these two coils are connected with main line conductors L', L² and L³ respectively. If translating devices are connected as indicated by dotted lines between L' and L², L² and L³, and L³ and L', as indicated at d', d², d³, the maximum current will pass from L' to L² through the intervening device d' one hundred and twenty degrees before the maximum current passes from L² to L³, which in turn is one hundred and twenty degrees before the maximum current passing from L³ to L', and this is one hundred and twenty degrees before the next similar maximum value of the current from L' to L². The three-phase current thus produced may be transmitted to distances and there utilized for operating three-phase alternating current motors, such as indicated at K, for instance, or any other suitable alternating current apparatus. The three-phase currents may, however, be re-transformed into two-phase currents by an organization of transformers H³, H⁴, similar to those shown at H', H², but reversed; that is to say, having their interconnected coils connected with the lines L', L², L³, and their independent coils connected with two-phase circuits h', h², h³ and h⁴. This organization will transform the three-phase currents into component two-phase currents; that is to say, each force A B, B C, C A, is resolved into its component, as will be readily understood by reference to Fig. 1.

Certain advantages, as hereinbefore indicated, are secured by the transmission of three-phase rather than two-phase currents, particularly the saving of energy in transmitting over a given circuit, inasmuch as less copper is required for the three-phase currents than for transmitting two-phase currents the same distance with the same loss. The laws governing this effect are now so well established that they need not be particularly set forth herein. Certain classes of work are best performed by two-phase currents, especially where the work is such as would tend to unbalance the system; that is to say, to cause more load at times to be thrown between one pair of conductors than between another pair of conductors.

It is found in practice that if a three-phase machine be more heavily loaded on one circuit than the others, a considerably greater discrepancy exists between the electromotive force on the loaded circuits and the electromotive forces of the unloaded circuits than is caused by an equal difference between the loads on the two circuits of a two-phase machine. For this reason it is usually necessary to provide against unequal loads upon the different circuits of a three-phase machine, whereas a considerable difference is allowable between the circuits of a two-phase machine. When the load is most conveniently placed upon a single circuit instead of being equally distributed among several circuits, as for instance in incandescent lighting, it is preferable to be able to load any circuit in a multiphase system without special reference to others. The three-phase system demands the distribution into three fairly equal and balanced groups, whereas the two-phase system requires division into but two groups, the unbalancing of which does not cause great differences between the pressure on the two branches. It is also readily seen that if the load be placed upon circuits differing ninety degrees the effect upon the generator due to reaction of circuits one upon the other and unbalancing of electromotive forces is practically the same whether the load is placed directly upon circuits from the generator or upon circuits after transformation or transmission by two-phase circuits throughout, or upon two-phase circuits which are derived from three-phase transmitting circuits from a two-phase generator, or upon two-phase circuits derived by transformers from a three-phase circuit supplied either directly or by transformers from a three-phase generator. For these reasons it is desirable to provide means in some instances for transforming the three phase currents at the receiving end into two-phase currents as indicated. Any unbalancing of the load upon the conductors $h'$, $h^2$, $h^3$ and $h^4$, will produce no detrimental result upon the lines $L'$, $L^2$, $L^3$, although that load will be distributed upon the conductors leading from the generator G in essentially the same manner as upon the conductors $h'$, $h^2$, $h^3$ and $h^4$. The two wires $h^2$ and $h^3$ may be united as one wire, as is well understood. This will be more readily understood by considering the effects produced in Fig. 2 by an unbalanced load upon the circuits $h'$, $h^2$, $h^3$, $h^4$. If, for instance, the circuit $h'$, $h^2$, is open and all the load is upon the lead $h^3$, $h^4$, then the energy required for that circuit will be transmitted entirely through the conductors $L^2$, $L^3$, by the transformers $H^2$ and $H^4$, in the usual manner of a single coil in simple alternating current systems. If however, the load is entirely upon the circuit $h'$, $h^2$, then the converters $H'$ and $H^3$ will operate as in the simple alternating current system, the circuit from the secondary of the transformer $H'$ through the primary of the transformer $H^3$ being by way of the conductor $L'$ and through the two halves of the primary coil of the transformer $H^4$ in opposite directions, therefore neutralizing the self-induction, and by way of the conductors $L^2$ and $L^3$ in opposite directions through the two halves of the secondary of the transformer $H^2$; thence back to the other terminal of the secondary coil of the transformer $H'$. This condition, however, will not unbalance the electromotive forces upon the three conductors $L'$, $L^2$ and $L^3$, so that three phase currents may be delivered from these conductors, as, for instance, to a three-phase alternating current motor K, under practically the same conditions as if no load were upon either of the transformers $H^3$ and $H^4$, or as if both converters were equally loaded. It will also be understood that alternating current motors, or any other desired apparatus, may be operated by currents delivered to the secondary circuits of the transformers $H^3$ and $H^4$, either jointly or independently. For illustration a two-phase alternating current motor is shown at $K'$.

In some instances it may be desired to transmit the currents over the lines $L'$, $L^2$, $L^3$ at a higher potential than that produced by the generator G, in which case the transformers $H'$, $H^2$ may have their coils so proportioned as to increase the electromotive forces. It is evident that this feature may be combined with those already described. In like manner the transformers at $H^3$ and $H^4$ may be either raising or lowering transformers, or they may transform at the same potential.

In some instances it may be desired to transform a three-phase current into three-phase current of a different potential; that is to say, without any change of phase. This may be accomplished as indicated in Fig. 3 by transformers having their primaries and their secondary circuits both connected in the manner described with reference to the secondaries of the transformers $H'$, $H^2$. In this figure $G'$ represents a three-phase alternating current generator having its three terminals connected with the three terminals $A'$ $o'$ $C'$ of the primary coils of the transformers $H^5$ and $H^6$. The relations and connections of these coils with each other are the same as described with reference to the secondary coils of the transformers $H'$ and $H^2$. The relations and connections of the secondary coils of the transformers $H^5$ and $H^6$ are the same as described with reference to the secondary coils of the transformers $H'$ and $H^2$. In this figure I have also shown two transformers $H^7$ and $H^8$ in which the divided coils are in the same transformers instead of being in different transformers, as either arrangement may be used.

In many instances it may be desired to use single coil transformers, in place of two coil transformers. Such an organization is illustrated in Fig. 4. The generator G delivers two-phase currents and it is desired to transform the same to three-phase currents to be transmitted over the lines $L'$, $L^2$, $L^3$. The cores of the two transformers $H^9$ and $H^{10}$ are each provided with equal coils, and these coils are connected so that the relative number of turns in the two transformers between the three-phase terminals are taken in the same manner as the secondary coils of the transformers $H'$ and $H^2$. This may be accomplished by leading the line $L'$ from a point in the coil of the transformer $H^9$ which is at a distance from the point of connection between this transformer and the middle point of the other transformer $H^{10}$ equal to one-half the square root of three, multiplied by the total number of turns of that coil. The same result is obtained in the transformers $H^{11}$ and $H^{12}$ in which the disposition differs from that shown in H⁹ and H¹⁰ in that the connection from the middle of one coil is made in one case to the end of the second coil and in the other case to an intermediate point of the second coil.

In some instances it is desirable to have the three-phase currents transmitted over four conductors instead of three conductors. This may be accomplished by the organization shown in Fig. 5, for instance, in which the construction is precisely the same as shown in Fig. 2 with the exception that a fourth conductor, $L^4$, is led from the point in the coil A $o$ at a distance equal to two-thirds of the length of the coil from the end A. It will be found that the electromotive forces measured from the line $L^4$ and each of the other lines $L'$, $L^2$ and $L^3$ are equal, and that the three electromotive forces differ from one another by one hundred and twenty degrees. The production of these phases of electromotive force by this method of making connections is indicated in Fig. 1, wherein the upper two thirds of the vertical line A O, and the two dotted lines, indicate the resulting electromotive forces; the relative phases being represented by the relative positions of said lines.

In some cases it may be desired to couple two or more transformers together in place of each of the transformers described with reference to Figs. 2, 3, 4 and 5 and this may be done by connecting the primaries $p'$, $p^2$, $p^3$, $p^4$, thereof in multiple, as indicated in Fig. 6, and their secondaries either in multiple or in series, as described; the connections, however, must be so arranged that a current entering at the middle point $o'$ will divide equally between the two branches and each branch will pass an equal number of times in opposite directions around each core of the transformers in this group and thus neutralize self induction. The primaries may, however, be connected in series and the secondaries in either multiple or series.

What I claim is—

1. In a system of multiphase electric transmission, the combination of a source of multiphase currents having a given number of phases, a main line system of conductors, a system of phase transformers at or near the source for receiving the multiphase currents and delivering to the main line system currents having a greater number of phases than received from the source, a system of consumption circuits, and phase transformers at the terminal of the main-line system delivering to said consumption circuits multiphase currents of a smaller number of phases than that of the main line currents.

2. An apparatus for the transformation of two phase alternating currents to three-phase alternating currents or vice versa, consisting of the combination of two alternating current transformers, the ratio of the length of a coil of one transformer to the length of the corresponding coil of the other transformer being approximately that of one to one-half the square root of three, and electrical connections from one terminal of the shorter of said coils to approximately the middle point of the other of said coils.

3. The combination of two alternating current transformers, the ratio of the length of one coil of one transformer to the length of the corresponding coil of the other transformer being approximately that of one to one half the square root of three, electrical connections from one terminal of the shorter of said coils to approximately the middle point of the other of said coils, and a system of electrical conductors for conveying three-phase currents connected with the remaining terminals of said coils and a system of electrical conductors for conveying two-phase currents connected with the terminals of the other coils of said transformers.

4. In an apparatus for the transformation of multiphase alternating currents, the combination of two alternating current transformers, with a connection from one end of one coil of one transformer with approximately the middle point of a coil of the other transformer.

5. An apparatus for transforming multiphase alternating currents in which the different currents bear a symmetrical phase relation to one another into a second system of multiphase alternating currents in which the phases are symmetrically related, which consists of two transformers, one coil or a portion thereof of one transformer being connected to an intermediate point in a coil of the second transformer.

6. The combination of two alternating current transformers, a source of two alternating currents differing in phase ninety degrees, connections therefrom with the primary coils of said transformers, and a connection from one terminal of the secondary coil of one of said transformers with an intermediate point in the secondary coil of the other transformer.

7. The combination of two alternating current transformers having primaries of equal length, a source of two alternating currents of equal potential differing in phase ninety degrees, connections therefrom with said primary coils, a connection from one terminal of the secondary coil of one of said transformers with an intermediate point in the secondary coil of the other transformer, and an electrical connection with the shorter coil at a point approximately two-thirds from its free end.

8. The method of transmission of electric energy to a distance by multiphase alternating currents, which consists in producing two-phase alternating currents, transforming the same into three-phase alternating currents, transmitting the three-phase currents to a distance and at the distant point retransforming the three-phase currents into two-phase alternating currents.

9. The hereinbefore described method of transmission to, and utilization of, electric energy at a distance from its point of generation, by means of multiphase alternating currents, which consists in generating two-phase alternating currents, transforming the same into three-phase alternating currents and transmitting the energy in the form of three-phase currents to a distance and there utilizing the energy thus transmitted.

10. The method of transmitting electric energy required for operating multiphase apparatus by alternating currents having two phases, which consists in transmitting three-phase alternating currents to a distance, transforming the same into two-phase alternating currents, and utilizing such transformed currents.

11. The hereinbefore described method of multiphase alternating current distribution which consists in generating alternating currents of a given number of phases, transforming the same into alternating currents of a greater number of phases, transmitting the alternating currents thus produced and utilizing such currents.

12. The hereinbefore described method of multiphase distribution which consists in generating alternating currents of a given number of phases, increasing the potential of the currents thus generated and at the same time transforming the currents into alternating currents of a greater number of phases and transmitting the latter currents.

In testimony whereof I have hereunto subscribed my name this 23d day of February, A. D. 1894.

CHAS. F. SCOTT.

Witnesses:
 JAMES W. SMITH,
 HAROLD S. MACKAYE.